UNITED STATES PATENT OFFICE.

EDWARD GOODRICH ACHESON, OF NIAGARA FALLS, CANADA, ASSIGNOR TO THE ACHESON COMPANY, OF NIAGARA FALLS, NEW YORK, A CORPORATION OF NEW JERSEY.

MANUFACTURE OF EARTHENWARE.

SPECIFICATION forming part of Letters Patent No. 722,791, dated March 17, 1903

Application filed December 18, 1901. Serial No. 86,466. (No specimens.)

*To all whom it may concern:*

Be it known that I, EDWARD GOODRICH ACHESON, a citizen of the United States, residing at Niagara Falls, Ontario, Canada, have invented certain new and useful Improvements in the Manufacture of Earthenware, of which the following is a specification.

My invention relates to a novel earthenware or ceramic product and to the preparation of clays, silicious compounds, and earthy minerals for the manufacture of such product, and more particularly to the production of or improvement in the plasticity and binding strength of the clays, silicious compounds, and earthy minerals.

It is well known that while the use of articles of pottery or earthenware is in many instances most desirable the material cannot be employed in some cases, first, because of its lack of strength, and, secondly, because of the shrinkage and warping of the material during manufacture, rendering it difficult to insure the production of articles of uniform shape and dimensions.

I have discovered that it is practicable to so treat clay and other earthy materials as to insure greater strength in the products made therefrom, to greatly reduce shrinkage and warping in the process of drying and baking, and also so as to very materially increase solubility and the plasticity of the material. This I find may be accomplished by the addition to the material of what I term a "modifying agent." Different agents may be employed; but I have discovered that earthy materials when non-plastic may be rendered plastic and plastic ones made more plastic by treatment with an agent having the astringent tannic principles contained in nutgalls, tea-leaves, sumac, hemlock-bark, oak-bark, cutch, and many other barks, leaves, nuts, and woods, all of which contain tannin or are capable of those reactions that are recognized as or considered due to tannin.

The word "tannin" as I herein use it is not confined to gallotannic acid or any one of the many compounds known to chemistry as "tannic acids," but to the entire class. Watts's *Dictionary of Chemistry* says on this subject, under the caption "Tannin, Tannic Acids:" "Under the above names are included a large series of compounds occurring in the vegetable kingdom of different constitutions, many of which have been very imperfectly studied." Therefore while I confine the words "modifying agent" to agents of a vegetable origin I would define them in their application to this descriptive matter as being broader and more general even than that above attributed to the word "tannin," and I include any compound derived from vegetable matter containing the active principle necessary for the production of the changes or modifications or transformations herein specified as occurring in the clay. Thus an aqueous infusion of common straw will produce increased softness, thinness, or fluidity of clay.

In carrying out my invention I make a "body" composition by subjecting the clay, silicious compound, or earthy mineral to a more or less prolonged treatment in or with a solution of tannin or equivalent modifying agent. Thus when I wish to improve the plastic and binding qualities of kaolin I place a weighed amount of the earthy material, as clay, in some suitable tank or vat, add the desired amount of tannin, and then thoroughly wet the mass with water, or I may dissolve the tannin or its equivalent and add the solution to the clay. The whole is then thoroughly stirred and allowed to stand until the desired action has occurred. Other things being equal, the degree of action and effect on a given clay is measured by the amount and activity of the added material and the duration of exposure. I have had good results with kaolin to which was added one-half of one per cent. of gallotannic acid, with sufficient water to wet and cover the mass and allowing the same to stand for twenty-four hours. Much better results were obtained with kaolin to which was added two per cent. of catechu and enough water to wet and cover the mass, allowing the whole to stand for one month, and the effect was still further increased when the mass stood under water for two months. I have found that clay treated in this way is changed in a most remarkable manner. Thus the amount of water required to reduce it to a given degree of softness, thinness, or fluidity may be decreased over fourteen per cent. The plasticity of the clay is much increased, it being easier to work or form into delicate shapes. The shrinkage in drying is much reduced, while the tensile strength of the dried and baked clay may be increased over forty per cent.

The presence of tannin or other modifying agent produces a chemical or physical change in the clay or earthen material that is not dependent upon its continued presence, as I have found that after the treatment has been prolonged sufficiently to produce a desired effect the clay may be thoroughly washed and all trace of soluble tannin removed without destroying the peculiar characteristics that have been imparted to it by the previous treatment. It will therefore be seen that I have produced a novel article of earthenware having much greater strength than earthenware articles heretofore made and that I have provided a body composition which is not only of much greater plasticity, but which will when formed into desired shapes and dried or baked retain its form and proportions to a greater degree than ordinary body compositions. It will further be seen that I have discovered that it is possible to produce the desired effects by the use of a modifying material combined with the earthen material and that a modifying material containing tannin is peculiarly effective.

I am aware that salts of the alkalies and other substances have been combined with clay to act as a flux in burning; but my invention is distinguished from this by the discovery that the agents specified above will act to modify the character of the body whether burned or not, producing effects never before known as resulting from such use.

Without limiting myself to the use of the specific materials or proportions stated, I claim—

1. The new manufacture of earthenware, substantially as hereinbefore described, resulting from treating a body material with a modifying agent having effects like those due to the effects of tannin thereon, possessing the characteristics of increased strength and plasticity and decreased absorption of water and shrinkage in drying.

2. A new manufacture of earthenware, comprising a body material treated with tannin as a modifying agent, substantially as described.

3. The within-described improvement in the manufacture of earthenware, which consists in treating a body material with a modifying agent having the effects on the body material like those due to the effects of tannin on said material, then forming the mass into the desired shape.

In testimony whereof I have signed my name to this specification in the presence of two subscribing witnesses.

EDWARD GOODRICH ACHESON.

Witnesses:
 FRANCIS A. J. FITZ GERALD,
 FRANK N. COE.